3,158,607
17-TETRAHYDROPYRANYL ETHERS OF
2-METHYL, 3-KETO ANDROSTANES
Alexander D. Cross, Mexico City, Mexico, assignor to Syntex Corporation, Panama, Panama, a corporation of Panama
No Drawing. Filed Nov. 18, 1963, Ser. No. 324,243
Claims priority, application Mexico, Jan. 3, 1963, 70,369
3 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers of 2α-methylandrostanes, 2-methyl-Δ¹-androstenes and the corresponding 19-norderivatives, all represented by the general formula:

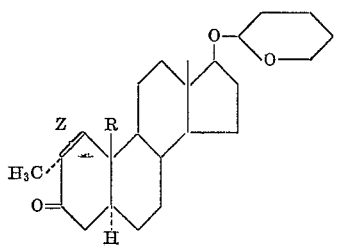

wherein R represents hydrogen or methyl and Z represents either a saturated linkage or a double bond between the carbon atoms at the 1-and 2-positions of the steroid nucleus.

A considerable amount of research in the steroid field has been done in the area anabolic agents, inasmuch as such compounds are useful in many areas of human and veterinary medicine. Thus, for example, an important application of anabolic agents in human therapy is in cases where the patient suffers from any of a number of debilitating diseases or conditions which produce a negative nitrogen balance, such as deficient nutrition or growth, chronic cachetic diseases, and osteoporosis, wherein it is necessary to increase the metabolism of proteins and obtain a positive nitrogen balance and greater deposition of calcium in bone tissues. Similarly, anabolic agents are extremely useful in the post-operative treatment of patients recovering from major surgical operations.

It is known that androstane derivatives such as testosterone, 19-nortestosterone and various substituted derivatives thereof exhibit good anabolic activity when administered parenterally, and that this is particularly the case with 17α-alkyl substituted derivatives such as 17α-methyltestosterone, 6α,17α-dimethyltestosterone-2-hydroxymethylene-17α-methyldihydroallotestosterone, 2α,17α - dimethyldihydroallotestosterone, and the like. However, it is also known that androstane derivatives of the type in question which do not have a 17α-alkyl substituent exhibit either very low anabolic activity or no anabolic activity at all when administered orally.

The present invention is based on the surprising and unexpected discovery that the novel 17-tetrahydropyranyl ethers represented by the above general formula, unlike, the corresponding 17-unetherified compounds, exhibit good anabolic activity when administered orally. In addition, the androgenic activity of these 17β-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers possess very low androgenic activity, while their anabolic activity is markedly greater than that of testosterone.

These novel 17-tetrahydropyranyl ethers also possess anti-estrogenic and anti-ovulatory activity, lower blood cholesterol levels, and inhibit the secretion of gonadotrophins by the pituitary gland.

The 17-tetrahydropyranyl ethers of the present invention are obtained from the corresponding 17β-hydroxy steroids by conventional methods of preparing tetrahydropyranyl ethers of steroids having free hydroxyl groups. Thus, the free 17β-hydroxyl-containing parent compound can be reacted, under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent such as benzene, diethyl ether, or the like, at a temperature of from about 0° C. to about 50° C., and preferably at room temperature (about 25° C.), for from about 1 hour to about 72 hours.

These novel compounds can be administered in any of a number of conventional pharmaceutical forms, and particularly in ones suited for oral administration, e.g., in solid form, such as pills, powders, capsules, tablets, or the like, or in liquid form, as syrups, emulsions, suspensions, and the like.

The 2α-methyl-19-norandrostan-17β-ol-3 - one starting material is obtained from 19-norandrostan-17β-ol-3-one by the method described by H. J. Ringold et al. in J. Am. Chem. Soc., vol. 81, page 427 (1959), while 2-methyl-19-nor-Δ¹-androsten-17β-ol-3-one is obtained by monobrominating 2α-methyl-19-nor-androstan-17β-ol - 3 - one and then dehydrobrominating the brominated intermediate, using calcium carbonate in dimethylformamide.

In order that those skilled in the art can more fully understand the present invention, the following Example is set forth. This Example is given solely for the purpose of illustrating the invention, and should not be considered as expressing limitations unless so set forth in the appended claims.

*Example*

To a solution of 1 gram of 2α-methylandrostan-17β-ol-3-one (2α-methyldihydroallotestosterone) in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 2α-methylandrostan-17β-ol-3-one (2α-methyl-17β-tetrahydropyranyloxyandrostan - 3-one).

By repeating this procedure in every detail but one, namely, replacing 2α-methylandrostan-17β-ol-3-one with 2α-methyl-19-nor-androstan-17β-ol-3-one, 2-methyl - Δ¹-androsten-17β-ol-3-one and 2-methyl-19-nor-Δ¹-androsten-17β-ol-3-one, respectively, the corresponding 17-tetrahydropyranyl ethers, namely 2α-methyl-17β-tetrahydropyranyloxy-19-norandrostan-3-one, 2-methyl-17β-tetrahydropyranyloxy-Δ¹-androsten-3-one and 2-methyl-17β-tetrahydropyranloxy-19-nor-Δ¹-androsten - 3 - one, respectively, were obtained.

I claim:
1. A compound represented by the general formula:

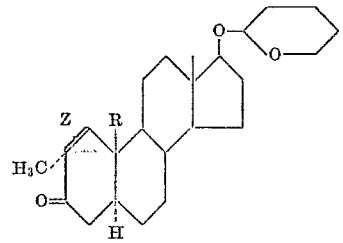

wherein R is methyl and Z is selected from the group consisting of a saturated linkage and a double bond.

2. The 17-tetrahydropyranyl ether of 2α-methylandrostan-17β-ol-3-one.

3. The 17-tetrahydropyranyl ether of 2-methyl-Δ¹-androsten-17β-ol-3-one.

References Cited in the file of this patent

Ruggieri et al.: "Gazz. Chim. Ital.," vol. 91, June 1961, pages 686–705.